(12) United States Patent
Filetto et al.

(10) Patent No.: US 6,300,951 B1
(45) Date of Patent: Oct. 9, 2001

(54) SYSTEM AND METHOD FOR QUEUES AND SPACE ACTIVATION FOR TOGGLING WINDOWS

(75) Inventors: Thomas M. Filetto, Endicott; Gilford F. Martino; Frank J. Robyck, both of Endwell; Vincent T. Timon, III, Binghamton, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,621

(22) Filed: Jan. 12, 2000

Related U.S. Application Data

(63) Continuation-in-part of application No. 08/964,290, filed on Nov. 4, 1997, now Pat. No. 6,025,842.

(51) Int. Cl.[7] ................................................ G06F 3/14
(52) U.S. Cl. ............................................ 345/345; 345/327
(58) Field of Search ................................. 345/343, 344, 345/345, 346, 326, 340, 348, 352–359, 145–146, 356–357, 327

(56) References Cited

U.S. PATENT DOCUMENTS

| | | | |
|---|---|---|---|
| 4,862,389 | 8/1989 | Takagi | 364/521 |
| 5,046,001 | 9/1991 | Barker et al. | 364/200 |
| 5,050,105 | 9/1991 | Peters | 364/521 |
| 5,252,951 | 10/1993 | Tannenbaum et al. | 345/358 |
| 5,377,317 | 12/1994 | Bates et al. | 345/342 |
| 5,412,776 | 5/1995 | Bloomfield et al. | 345/340 |
| 5,430,839 | 7/1995 | Jagannathan et al. | 395/159 |
| 5,519,827 | 5/1996 | Mizushima | 395/161 |
| 5,621,880 | 4/1997 | Johnson | 395/326 |
| 5,668,962 | 9/1997 | Kitami | 345/340 |
| 5,721,849 * | 2/1998 | Amro | 345/340 |
| 5,742,285 | 4/1998 | Ueda | 345/342 |
| 5,752,246 * | 5/1998 | Rogers et al. | 707/10 |
| 5,812,132 * | 9/1998 | Goldstein | 345/345 |
| 5,835,088 * | 11/1998 | Jaaskelainen, Jr. | 345/343 |
| 5,893,063 | 4/1999 | Loats et al. | 345/340 X |
| 5,900,877 * | 5/1999 | Weiss et al. | 345/356 |
| 6,034,689 * | 3/2000 | White et al. | 345/357 |

\* cited by examiner

*Primary Examiner*—Steven Sax
(74) *Attorney, Agent, or Firm*—Shelley M Beckstrand

(57) ABSTRACT

Rapid toggling of application windows to the forefront of a computer monitor. One or more queues are established by a user comprising indicia representative of a sequence of a plurality of open application windows. Sequential toggling among the windows of a given sequence is accomplished by actuating a mouse pointer positioned to the white space of any window within the given sequence.

12 Claims, 4 Drawing Sheets

SYSTEM AND METHOD FOR QUEUES AND SPACE ACTIVATION FOR TOGGLING WINDOWS

CROSS REFERENCES TO RELATED APPLICATIONS

This application is a continuation-in-part of U.S. patent application Ser. No. 08/964,290, filed Nov. 4, 1997 U.S. Pat. No. 6,025,842 by T. M. Filetto, et al. for a System and Method for Queues and White Space Activation for Toggling Windows.

BACKGROUND OF THE INVENTION

1. Technical Field of the Invention

This invention pertains to queueing application windows. More particularly, it pertains to rapid toggling of application windows to the forefront of a monitor, such as a computer or TV monitor.

2. Background Art

A single window within a television screen is currently available, as are multiple windows from different video sources. There is a need in the art for a system and method which allows a user to display a plurality of visual frames, some of which may be hidden from view, in a user defined sequential order and to generate audio from the window or frame having focus, or from an entirely different window or frame either in or not in the sequential order of display, thus enabling a user to view one or a plurality of windows of visual displays in sequence while selectively listening to the audio signal for a display in focus or from a different audio source.

Users of computers typically run several window applications at the same time, and need to go from one window to another. This is fine when both windows are visible, but when a window is obscured either partially or entirely by another window, it is more difficult to find and move control to the obscured window.

Similarly, emerging technologies provide for use of television monitors as computer monitors, and windows containing, for example, a plurality of video displays, on such TV monitors may be subject to the same difficulties. With Internet computing increasing in popularity, increasing use of TV's as personal computer input/output devices appears inevitable. There is a need in the art for a system and method for facilitating use of a TV monitor as a computer display device, and as a combined TV and computer display device, which facilitates user defined, sequential display of application and/or video display windows.

The process of changing control involves moving the mouse to the desired window and clicking on the window to bring it to the forefront and give it control It is sometimes required that one or more windows be moved, minimized, or enlarged before the desired window is brought into view to accept the mouse and respond to a click. This takes time and may take several mouse movements.

Different application suites and operating systems require different mouse button clicks and locations to click. For example, a window may require that the mouse be positioned on a specific area of the window in order for a single left button click to bring it to the forefront, and some don't.

There is, therefore, a need in the art for a system and method for bringing a desired window to the forefront of a TV monitor display without requiring that the mouse or other pointing or selection device be physically moved to the desired window.

SUMMARY OF THE INVENTION

In accordance with the method of the invention, at least one sequence of windows is established and a next window within that sequence brought to the forefront by activating a pointing device positioned on the white space or video image of any window in that sequence.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the invention, a system and method is provided which more rapidly brings a desired window display and/or sound to the forefront of a monitor, including a computer monitor or a TV monitor used as a computer input/output device and/or as a visual display of a plurality of windowed video and/or audio images.

Figure 1:
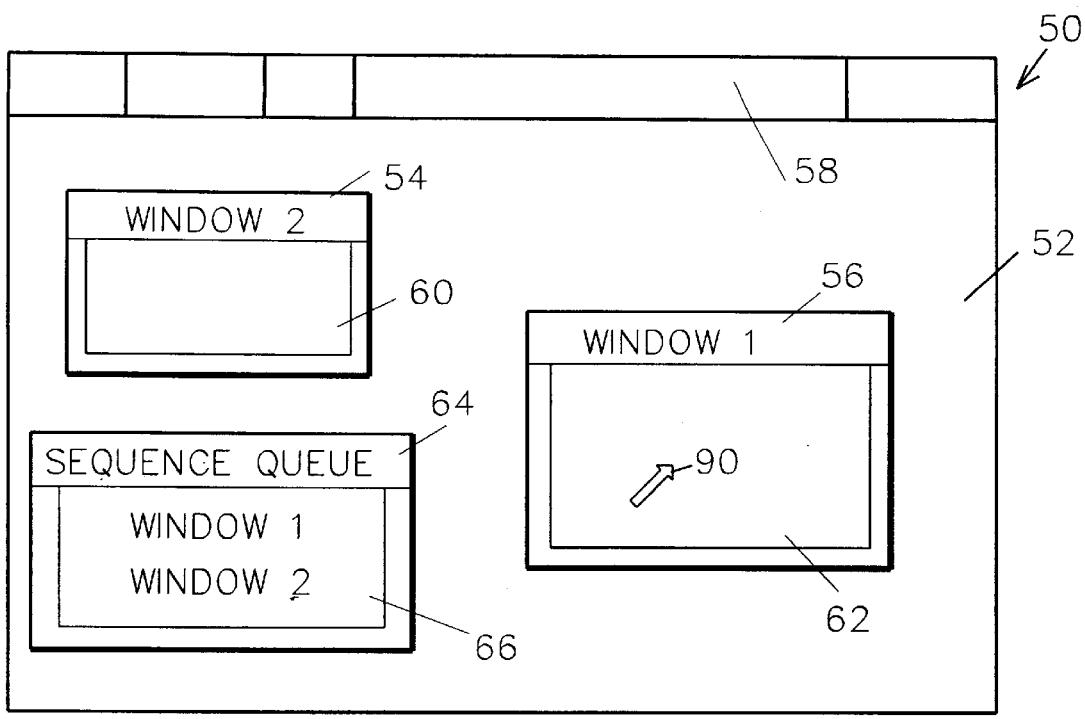
FIG. 1 illustrates a monitor display having two windows and a cursor.

Referring to FIG. 1, monitor 50 presents to a user a display area 52 including windows 54 and 56. Window 56 has white space 62 in which cursor 90 is positioned. Window 54 has white space 60. As used herein, "white space" also refers to running video and/or audio space.

In accordance with an exemplary embodiment, to initialize the system, the application or video display running in window 56 may present an application window 64 allowing the user to add to a sequence queue in white space 66 indicia identifying the order of sequence of windows 54, 56. Window 64 may then be deleted or minimized, leaving only windows 54 and 56 open in display area 52. Open windows may appear in display area 52, or may be minimized. In the latter case, when control is toggled in sequence to a minimized window, such minimized window may be enlarged and displayed in display area 52.

Thereafter, by double clicking a left mouse button in either white space 60 or 62, the user toggles control between windows 54 and 56 if the user desires to have the pointer visible. Alternatively, the user may hide the cursor in order to not disrupt a video display, and later restore it to the forefront. In accordance with a preferred embodiment, cursor (or mouse pointer) 90 remains in one place in the forefront of window 56. Alternatively, the cursor moves to the forefront (white space) of the window with control. Similarly, in a two window scenario with one of the windows partially or completely obscured, when a window comes to the forefront the object stays in the same physical location in monitor screen 52, only in the white space of the window in the forefront. It is not necessary, in any of these situations, for the user to move the mouse pointer 90 to the white space of a particular window and then click or double click for that particular window to have control (thus allowing the user to immediately begin keyboard entry in the window with control, even if the mouse pointer is not or has not been moved to it.) In accordance with yet another exemplary embodiment, a control key or key combination entered at the keyboard or a button or combination of buttons on the TV set or a remote control device may substitute for the mouse button. Similarly, a light pen or lazar pointing device may function as the mouse. And, of course, a user may configure the mouse so as to operate in the above manner with the left, right or middle button. In this exemplary embodiment, with only two windows 54 and 56 in display 52 and entered to sequence queue 66, a single click (which restores the previous window in the sequence queue) also serves to toggle control between windows 54 and 56. Sequence control window 64 may also be displayed by using the remote, buttons on the TV set, or a keyboard.

Figure 2:
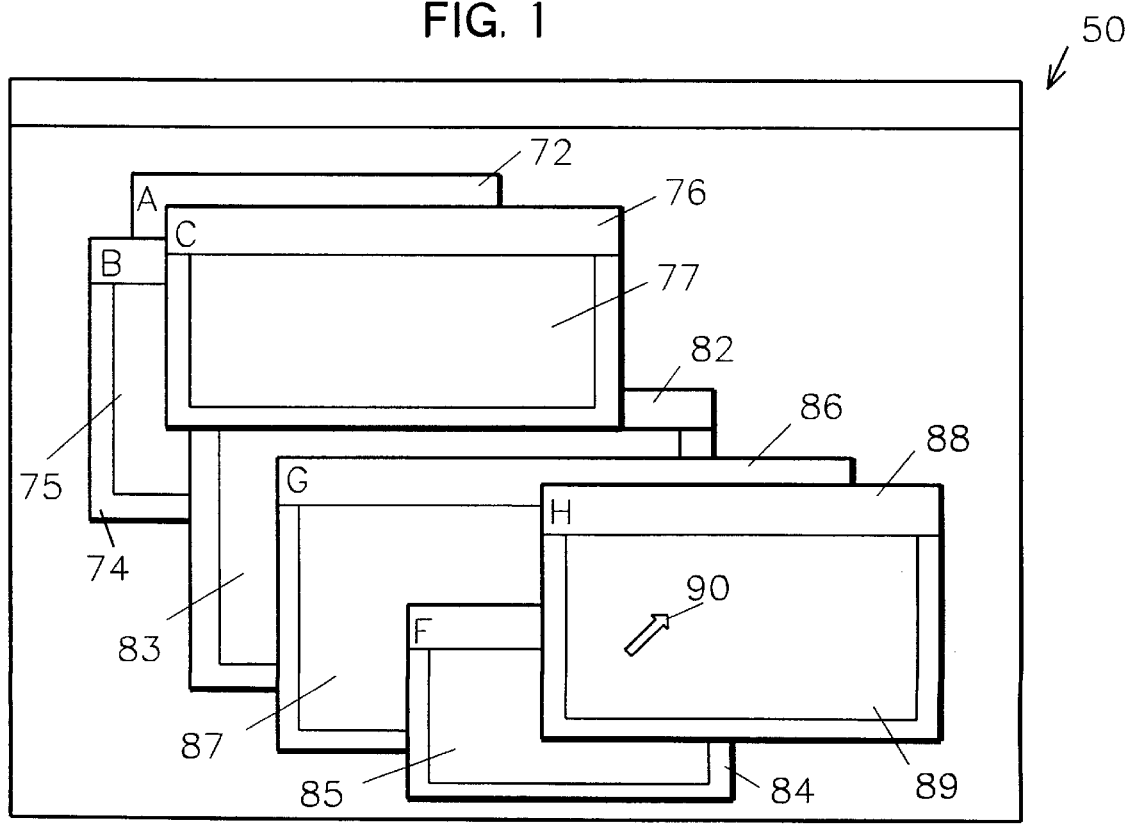
FIG. 2 illustrates the monitor with several windows, some partially or totally obscured by other windows.

Referring to FIG. 2, windows 72, 74, 76, 82, 84, 86 and 88 are illustrated. The white space of window 72 is totally obscured, and the remaining windows include white spaces (such as running video and/or computer applications) 75, 77, 83, 85, 87, and 89. Cursor 90 is positioned in white space 89.

Figure 3:
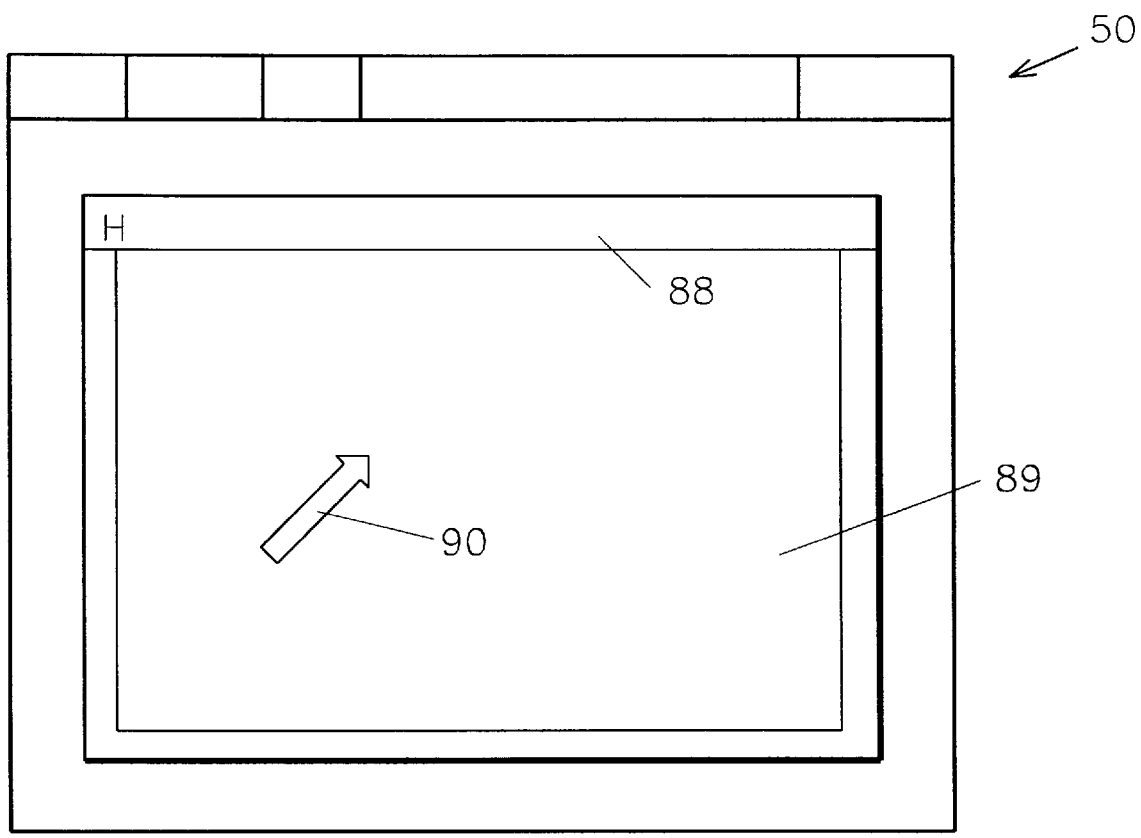
FIG. 3 illustrates the monitor with one window enlarged to occupy the entire screen, thus totally obscuring all other windows.

Referring to FIG. 3, window 88 has been maximized, so as to totally obscure all of the other windows 72, 74, 76, 82, 84 and 86.

Figure 4:
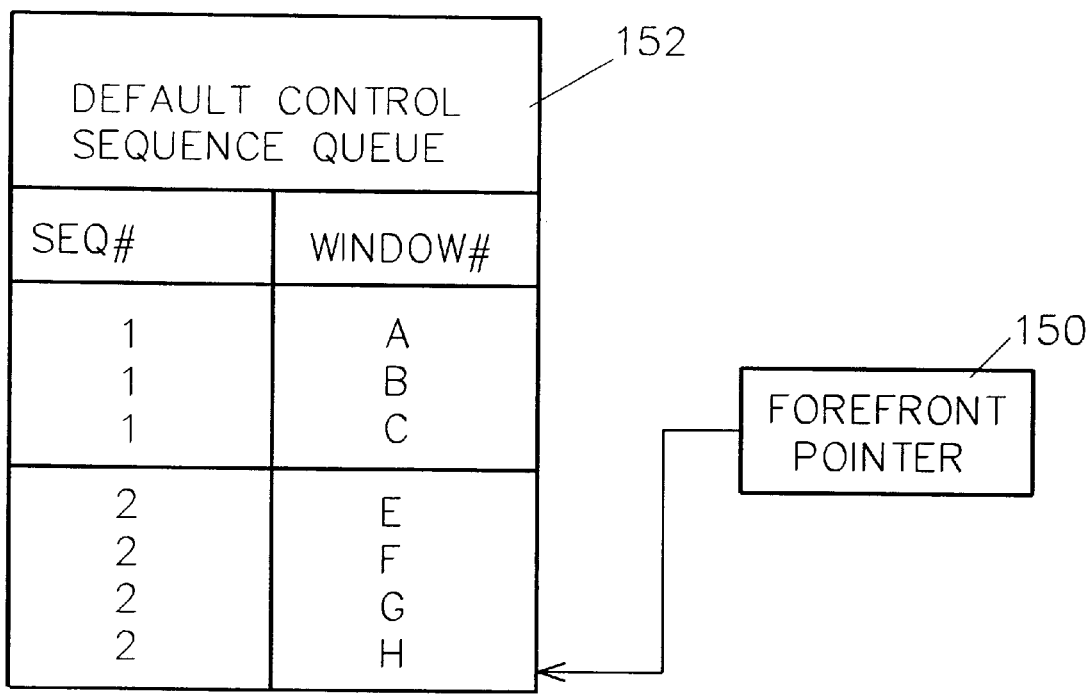
FIG. 4 is a diagram of the default control sequence queue and forefront pointer of the invention.

Referring to FIG. 4, the user has initialized operation (such as by use of sequence queue window 64) so as to establish two sequences. Sequence 1 includes windows A 72, B 74 and C 76 in that order. Sequence 2 includes windows E (not visible) 82, F 84, G 86 and H 88. Forefront pointer 150 points to the entry in queue 152 corresponding to window H 88 in sequence 2, and that window 88 is the forefront, or control window.

The user accesses windows in the order or sequence EFGHEFG . . . by double clicking on the white space of any of windows E 82, F 84, G 86 or H 88. By positioning cursor 90 to the white space of any window 72, 74 or 76 in sequence 2, double clicking will bring windows A 72, B 74 and C 76 to the forefront in the order ABCABC . . . .

Single clicking the mouse control button brings the previous window of a sequence to the forefront. Thus, single clicking in any of white areas 75 or 77, will sequence control among windows A, B and C in the order CBACBA . . . ; and single clicking in any of white areas 83, 85, 87 or 89 will sequence control among windows E, F, G, and H in the order HGFEHG . . . . When a window is thus actuated in sequence, it comes to the forefront of monitor display area 52. If any window coming to the forefront places the mouse pointer in a different window, double clicking in that different window will bring the next window in the control sequence 152 to the forefront of monitor 52. Alternatively, remote control buttons, TV buttons, keyboard keys may be used to perform the double and single click control above described.

In accordance with the invention, applications or suites of applications such as Lotus Notes and Microsoft Developers Studio typically have a main application window 88 with many open windows 82, 84, 86 within main application 88.

Figure 5:
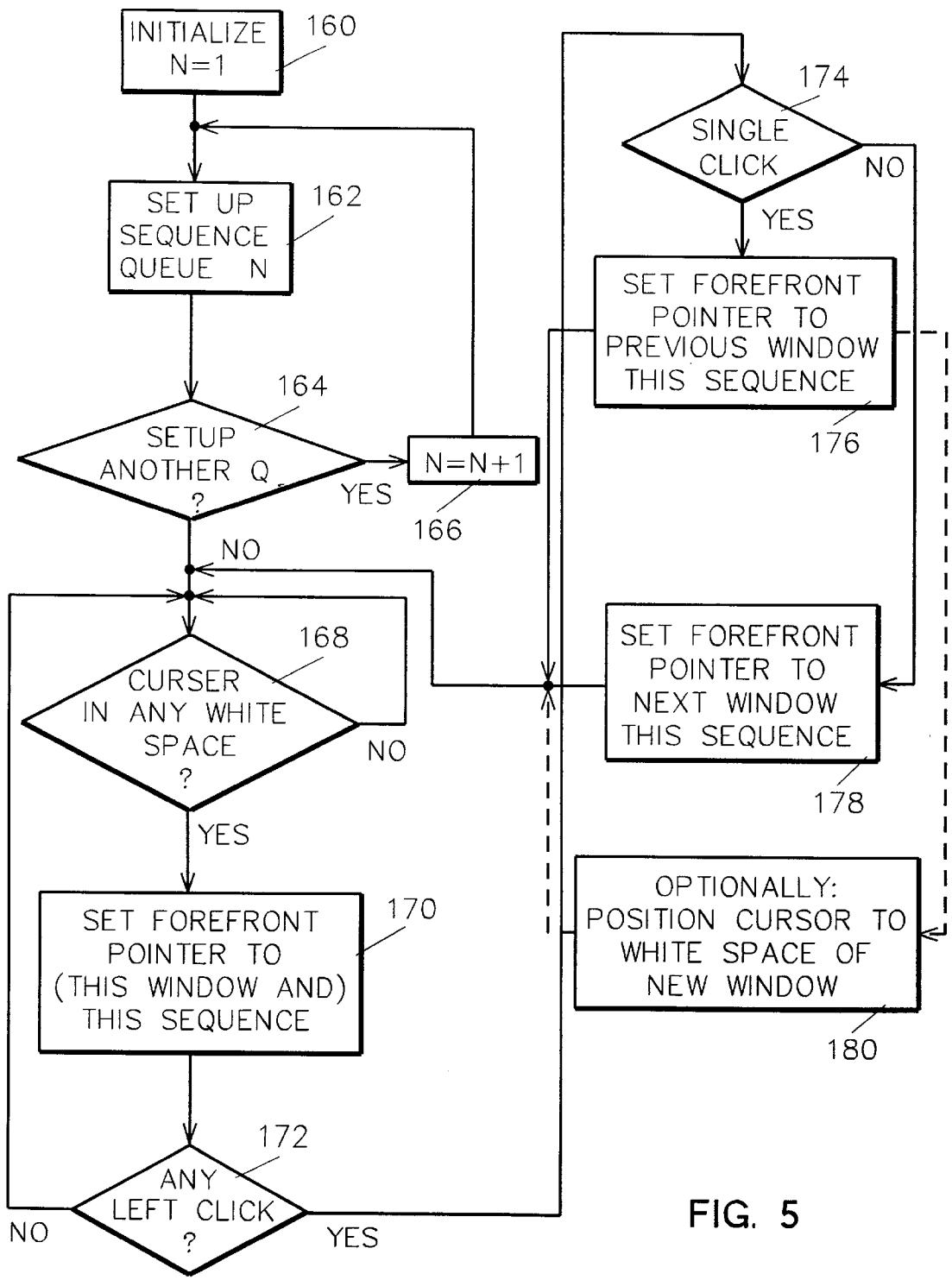
FIG. 5 is a flow diagram of the method of the invention for bringing windows to the forefront in sequence.

Referring to FIG. 5, a flow diagram of an exemplary embodiment of the method steps of the invention is illustrated. The method of the invention may be executed under control of code residing in the application program. When used in a modern C++ object oriented environment, the code may reside at the operating system level without requiring changes by the applications. If an operating system exists for the TV, the setup and control may be provided in the operating system. If an operating system does not reside in the TV or include the setup and control code required, then the operating program will need to include this function much like a picture-in-picture (PIP) function is provided. In step 160, the system is initialized to operate such as by either displaying in window 64 a previously saved sequence, or by setting the variable N equal to 1 and displaying an open window 64. In step 162, the user enters in sequential order indicia identifying the windows to be included in queue 152, and ask for or enable the selection of another sequence (N+1). If so, in steps 164 and 166 control is passed back to step 162 and the user enters the next sequence. In accordance with a modification to steps 162–166, the user may add a window to the sequence of his choice, or to a default sequence. Any number of sequences may be provided.

After entry of sequences to control sequence queues 152, processing waits in step 168 for cursor 90 to be placed in any white space. In step 170, with cursor 90 in a white space of this window, forefront pointer 150 is set to point to the sequence 152 to which this window 88 pertains. Thus, the order of sequence of windows is configured by the user of an application, and windows can be arranged in multiple sequences.

In steps 172 and 174, processing waits for a double or single click from a mouse for cursor 90, or other pointing device, or functionally equivalent input from a remote control device, a keyboard, television button, or the like. If a single click, in step 176 forefront pointer 150 is set to previous window G 86 in sequence 152. If a double click, in step 178 forefront pointer 150 is set to next window E 82 in sequence 152 optionally, in step 180, after forefront pointer 150 is set to a new window, either the preceding or following window, cursor 90 is positioned to the white space of the new window. Thus, navigation among windows does not require any keystrokes as soon as a window is brought to the forefront and made active.

In accordance with further embodiments of the invention, various types of mouse button controls can be actuated by providing a plurality of buttons and/or by single or double clicking, or so forth, to toggle in forward or reverse sequence through the queues of open windows.

The method and system of the preferred embodiment of the invention allows a user to initialize sequences of multiple video sources or windows with the push of a button on a remote control or TV set. For this method of queuing, the window with the focus may also provide the audio signal. Alternatively, the audio signal may be provided from a different source, thus allowing the user to view one or a plurality of video displays, such as sports events, in sequence while listening to a different audio source, such as the latest stock report, or to concert or opera music from a separate channel either in or not in the sequence of video displays.

The sequence of video displays may be established by providing, for example, a remote control device with two buttons. The first button, when selected, presents the video sources, channels, or computer application windows available. Typical up/down buttons on the remote control or keyboard may then be used to highlight desired channels which are then selected in the user desired order by activation of the second button. Thereafter, the use of the up/down buttons are used to move within the selected sequence window or video input choice window, much like the single click, double click operation previously described.

ADVANTAGES OVER THE PRIOR ART

It is an advantage of the invention that a system and method is provided for bringing a desired window to the forefront of a monitor display without requiring that a mouse pointer be physically moved to the desired window.

It is a further advantage of the invention that windows in sequence are brought to the forefront of a monitor display even if hidden without requiring the moving or altering (such as by minimizing or reducing in size) windows covering a desired hidden window.

It is a further advantage of the invention that a user configures the order or sequence of windows, and that windows may be added to a sequence of his choice.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for controlling the operation of a television display, comprising the steps of:

establishing in a first queue a first sequence of a plurality of open windows selectively containing computer applications and video displays;

establishing in at least one additional queue at least a second sequence of a plurality of open windows selectively containing computer applications and video displays;

responding to user first type activation of a selection device positioned to the white space of any window of either of said sequences to select and bring to the forefront the next window of said selected sequence; and responding to user second type activation of said selection device positioned within the white space of any window in said sequence to bring to the forefront of said television display the previous window of said sequence.

2. The method of claim 1, wherein said establishing step comprises the steps of:

responding to user input to establish a plurality of sequences and include within each of said sequences one or more window indicia.

3. The method of claim 2, comprising the further steps of:

responding to user activation of a selection device positioned to the white space of a window of a first sequence selectively to position to the forefront a previous or next window of said first sequence; and responding to user activation of a selection device positioned to the white space of a window of a second sequence selectively to position to the forefront a previous or next window of said second sequence.

4. The method of claim 3 wherein said activation is selected from the group consisting of a single click of a mouse button, a double click of said mouse button, at least one click of a first mouse button, at least one click of a second mouse button, a TV set button, a remote control device button, and keyboard key.

5. The method of claim 1 wherein said sequence includes a main application window of a suite of video displays and application windows and a plurality of open windows associated with said main application window.

6. The method of claim 5 wherein said main application window is one of a suite of applications.

7. System for controlling the operation of a TV monitor as computer monitor and TV display, comprising the steps of:

means for establishing in a queue at least one sequence of a plurality of open windows selectively containing running video and computer application displays; and means responsive to user first type activation of a selection device positioned within the white space of any window of said sequence to bring to the forefront the next window of said sequence means responsive to user second type activation of said selection device positioned within the white space of any window in said sequence to bring to the forefront the previous window of said sequence.

8. A program storage device readable by a machine, tangibly embodying a program of instructions executable by a machine to perform method steps for controlling the operation of a TV and computer monitor, said method steps comprising:

establishing in a queue at least one sequence of a plurality of open windows, each said window selectively containing a computer application or running video display;

responding to user first type activation of a selection device positioned to the white space of any window of said sequence to bring to the forefront the next window of said sequence; and responding to user second type activation of said selection device positioned to the white space of any window in said sequence to bring to the forefront the previous window of said sequence.

9. An article of manufacture comprising:

a computer usable medium having computer readable program code means embodied therein for controlling the operation of a TV monitor, the computer readable program means in said article of manufacture comprising:

computer readable program code means for causing a computer to establish in a queue at least one sequence of a plurality of open windows;

computer readable program code means for causing a computer to respond to user first type activation of a selection device positioned to the white space of any window of said sequence to bring to the forefront the next window of said sequence; and respond to user second type activation of said selection device positioned to the white space of any window in said sequence to bring to the forefront the previous window of said sequence.

10. Method for controlling a TV display monitor, comprising the steps of:

establishing in a plurality of queues a plurality of sequences of open windows, selecting and bringing to the forefront of said monitor a next window within a selected sequence by a first type activation of a pointing device positioned on the white space of any window in said selected sequence, and selecting and bringing to the forefront of said monitor a previous window within a selected sequence by a second type activation of said pointing device positioned on the white space of any window in said selected sequence.

11. The method of claim 10, further comprising the step of selectively obtaining audio output from a source other than the window brought to the forefront.

12. The method of claim 10, said windows selectively presenting running video and computer application displays.

* * * * *